April 10, 1945.  T. WHEATLEY  2,373,439
RIVER WEIGHT
Filed July 29, 1943
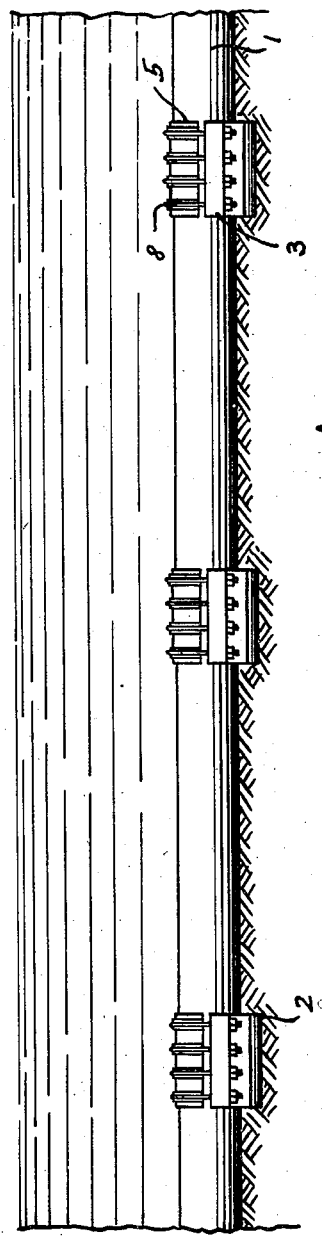
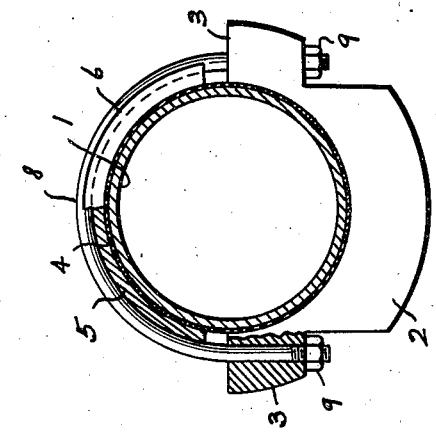
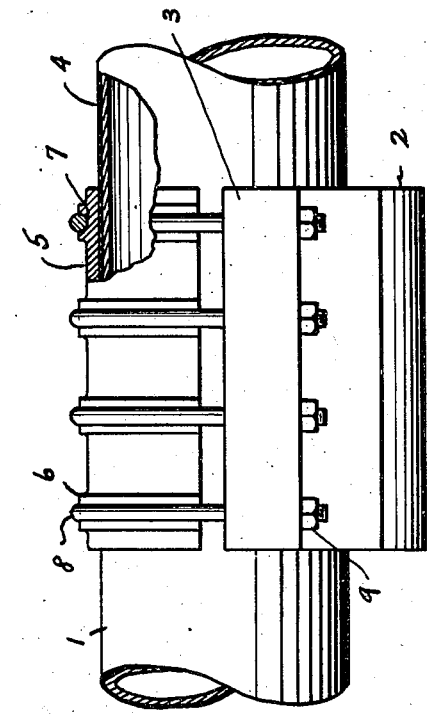

UNITED STATES PATENT OFFICE 2,373,439

RIVER WEIGHT

Thomas Wheatley, Houston, Tex.

Application July 29, 1943, Serial No. 496,671

1 Claim. (Cl. 138—25)

This invention relates to what is commonly called a river weight.

An object of the invention is to provide a pipe clamp which is formed with a weight and which is designed to be applied to a pipe line laid across a stream of water or other body of water. A plurality of clamps will be applied to the pipe which is to be submerged in the water and the clamps embodying the weights are spaced apart along the pipe and serve the purpose of maintaining the pipe on, and anchored to, the river bottom.

Another object of the invention is to provide a clamp of the character described which may be securely fastened to the pipe without injuring the pipe.

With the above and other objects in view the invention has particular relation to certain novel features of construction, arrangement of parts and use, an example of which is given in the specification and illustrated in the accompanying drawing wherein:

Figure 1 shows a side view of the pipe on bottom with the clamps secured thereto.

Figure 2 shows an enlarged side elevation, partly in section of the pipe and clamp and Figure 3 shows a transverse, sectional view of the pipe showing an end view of the clamp partly in section.

Referring now more particularly to the drawing wherein like numerals of reference designate the same parts in each of the figures, the numeral 1 designates the pipe line to be laid across a stream or other body of water.

That portion of the pipe line submerged should be weighted so that it will be on bottom and will not shift its position.

The numeral 2 designates a weight which, in its preferred form is an elongated metallic body whose underface is convex and whose upper portion has the laterally extended flanges 3, 3. The upper side of the weight is concave from end to end so a to snugly fit the underside of the pipe, as more accurately shown in Figure 3. The weight will therefore bury itself in the soil at the bottom of the river or other body of water, as shown in Figure 1 and will anchor the pipe in place.

Before the pipe is submerged it is coated with a protecting coating 4.

Mounted on the pipe opposite the weight 2 there is a half-round saddle 5 which is of substantially the same length as that of the weight. This saddle has the external arcuate ribs 6 formed with grooves 7 to receive the inverted U-shaped clamp bolts 8. The ends of these clamp bolts are fitted through the flanges 3 and are secured in place by the clamp nuts 9 threaded onto their respective ends.

The saddle 5 is provided so that the clamp bolts will not injure the coating 4 or come into contact with and crack the enamel of the pipe.

As the weights are being applied to the pipe, before it is submerged, suitable lifting tongs may be engaged with the flanges 3 to hold the weight in place while the saddle and clamp bolts are being applied to the pipe.

The drawing and description are illustrative merely while the broad principle of the invention will be defined by the appended claim.

What I claim is:

In combination a weight comprising an elongated metallic body whose under side is convex from end to end and whose upper portion is laterally extended forming side flanges, said body being concave from end to end on the upper side to receive a pipe, a saddle opposite the weight and concaved from end to end to fit over the pipe, and having external, transverse ribs provided with grooves approximately from end to end of the ribs, U-bolts seated in the grooves and whose ends extend through the flanges and clamp nuts screwed onto the ends of said bolts to releasably connect the U-bolts to the flanges.

THOMAS WHEATLEY.